Figure 1:
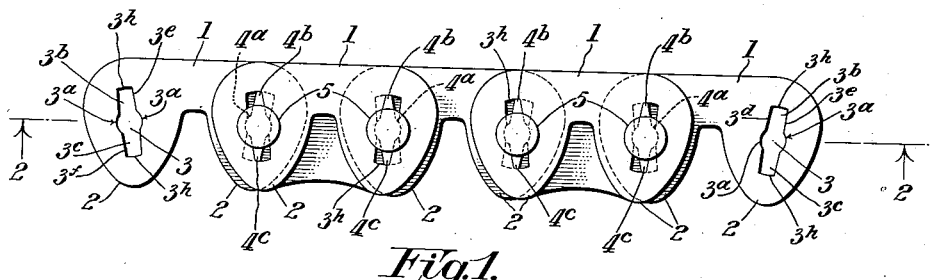

Sept. 14, 1937.   F. MÜLLER   2,093,156
POWER TRANSMISSION CHAIN AND PARTS THEREFOR
Filed Nov. 12, 1936   2 Sheets-Sheet 1

Inventor
Friederich Müller
By Leonard E. Fischer
Attorney

Patented Sept. 14, 1937

2,093,156

UNITED STATES PATENT OFFICE 2,093,156

POWER TRANSMISSION CHAIN AND PARTS THEREFOR

Friederich Müller, Elizabeth, N. J.; Union County Trust Company, Elizabeth, N. J., executor of said Friederich Müller, deceased Application November 12, 1936, Serial No. 110,499

8 Claims. (Cl. 74—251)

My invention relates to power transmission chains, of the silent type, and it has as its primary object to provide a chain of this nature which is quiet and efficient in operation, which is relatively inexpensive to manufacture, and which is less subject to wear than similar chains heretofore provided.

More specifically stated, my invention relates to an improved pivotal connection between the links of a chain of this nature and it aims to overcome certain inherent defects of prior constructions.

Among the factors which render it difficult to provide an ideal pivotal connection for a silent chain is the fact that such a chain normally operates under two entirely different conditions during its continuous passage about its driving and driven gears. For example, when on its straight run between the two gears the links are in a straight line and therefore one driving condition obtains. When passing about its driving and driven gears each link is flexed out of a straight line with each of its adjacent links and it therefore presents a different driving condition.

Many forms of pivotal connections for silent chains heretofore have been provided and many patents have been granted thereon. Certain ones of these have been efficient when the chain is on its straight run while others have favored the turning movement of the links when passing about the driving and driven gears.

Obviously, for the mere turning movement of one link relative to the next, a truly cylindrical pivot pin is the most effective. Such a pivot pin, however, is not best adapted to withstand the wearing action incident to the pull of the chain, and even a slight amount of wear in each pivot will result in substantial elongation of the chain and thus render it unfit for use, as is well understood.

In my prior Patent No. 1,649,845, November 22, 1927, I have disclosed a chain having a form of pivotal connection between the adjacent links embodying flat angularly disposed driving surfaces which greatly reduced the wear incident to a driving action both on the straight run of the chain and when the chain is passing about its driving and driven gears. While the chain disclosed in that patent was a decided advance in the art, it was, however, not entirely satisfactory as there was presented, at the juncture of the angularly disposed flat driving surfaces, a relatively sharp corner which received the driving thrust and formed the fulcrum point as the chain was changing from its straight to its curved path. This turning movement on the sharp corner produced, in time, undesirable wear in the links.

The present invention combines, in a unitary structure, the desirable features of both the cylindrical pivot pin and the flat driving wall construction disclosed in my above mentioned patent and thereby renders available a greatly improved chain which effectively resists wear in all of its driving positions.

Figure 2:
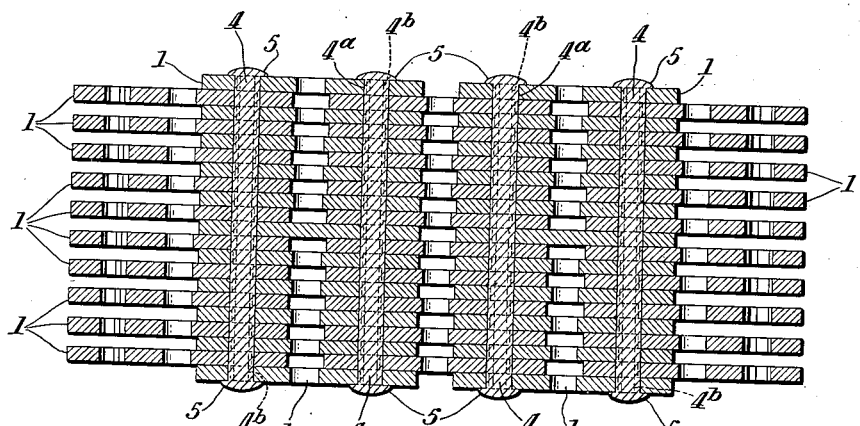
Figure 3:
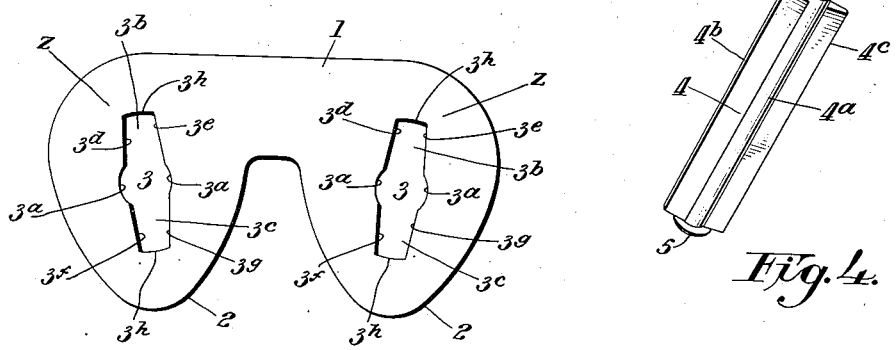
Figure 4:
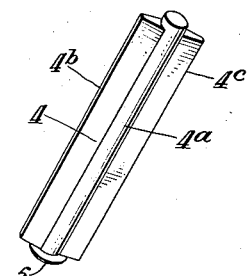
Figure 5:
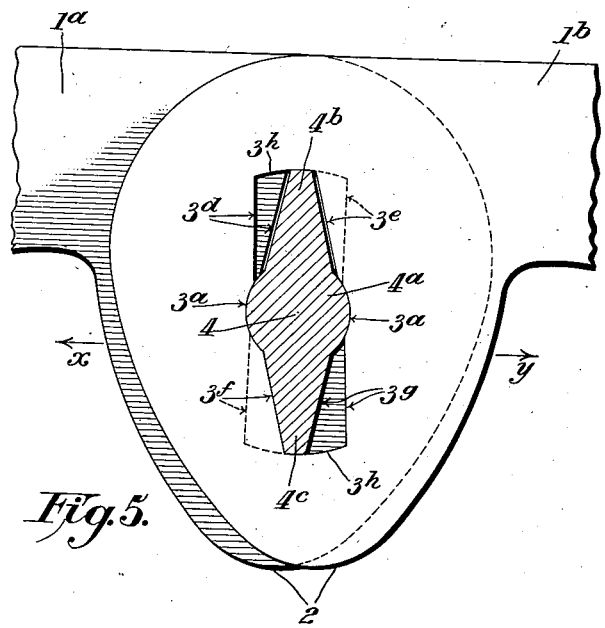
Figure 6:
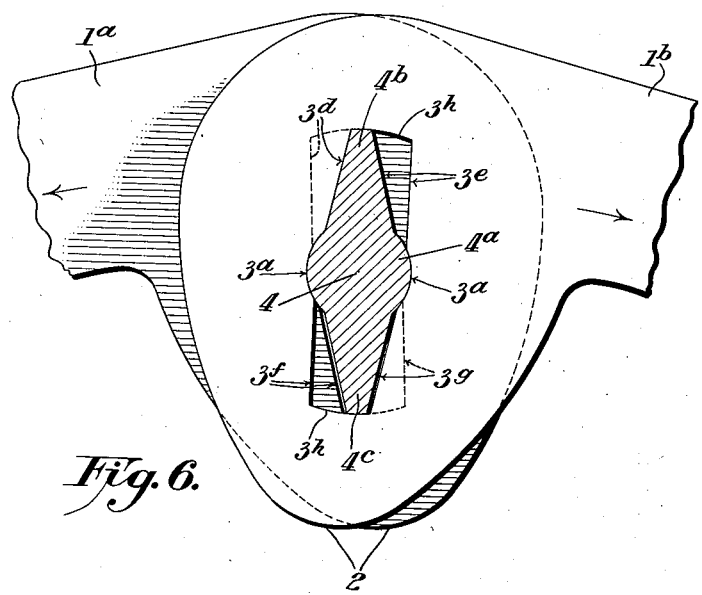

This invention will best be understood by reference to the accompanying drawings in which I have illustrated the preferred embodiment of my invention and in which Fig. 1 is a side view of a chain embodying the present invention. Fig. 2 is an inverted sectional view taken substantially on the line 2—2 of Fig. 1. Fig. 3 is an enlarged side view of a single link. Fig. 4 is a detail perspective view of one of my improved pivot pins later to be described. Fig. 5 is a sectional elevation, on an enlarged scale, illustrating the positions assumed by the adjacent links and the pivot pin, passing through openings therein, on a straight run of the chain, and Fig. 6 is a view similar to Fig. 5 but illustrating the two links flexed as when passing over the driving or driven gear.

Referring more specifically to the drawings the invention is disclosed as embodied in a chain comprising a series of overlapping flat sheet metal links, designated generally as 1, each having, at its opposite ends, toothed portions 2 adapted to fit the complemental spaces between the teeth of the driving and driven gears about which the chain passes.

Each link is provided, at each end, with an opening 3 comprising, in part, two arcuate mid-portions 3ª adapted to receive the cylindrical central portion 4ª of a pivot pin 4, which passes through the aligned opening in the assembled links. The pin has its projecting free ends 5 riveted over as shown most clearly in Fig. 2. The openings 3 in each link also comprises oppositely extending straight walled substantially rectangular portions 3ᵇ and 3ᶜ affording flat faces 3ᵈ, 3ᵉ and 3ᶠ, 3ᵍ, respectively, adapted to receive between them oppositely extending wedge-shaped ribs 4ᵇ and 4ᶜ, respectively, formed on the pivot pin 4.

As will be seen from Fig. 3 the portions 3ᵇ and 3ᶜ are not truly rectangular, the sidewalls thereof diverging slightly toward the mid-portion 3ª of the opening and the outer ends thereof being formed as arcs of a circle the axis of which coincides with the axis of rotation of the pivot pin 4.

It will be understood that the concave portions 3ª of the openings 3 in the links and the complemental convex portion 4ª of the pivot pin constitute, in effect, a substantially circular bearing between the pin and the links and therefore, afford an ideal pivotal connection therebetween.

Referring now to Fig. 5, in which a portion of the chain is shown in the position it assumes when in its straight line run, the stresses on the adjacent links here designated as 1a and 1b, are in the directions indicated by the arrows x and y, respectively. In this position the driving stresses are transmitted by the rib 4c, on the pivot pin, to the flat face 3f of the link 1b, and the flat face 3g of the link 1a. It will be noticed that the face 3f of the link 1a and the face 3g of the link 1b are out of contact with the rib 4c. In this same position the rib 4b of the pivot pin is out of contact with the faces 3d and 3e of the links 1a and 1b. Thus it will be understood that on the straight run of the chain the driving stresses are taken mainly by flat surfaces located below the pivotal point, as in my prior Patent No. 1,649,845.

Fig. 6 illustrates the position of the parts as the chain is flexed to pass about the driving or driven gears. In this position the rib 4c of the pivot pin 4 is entirely free of the surfaces 3f and 3g of the links 1a and 1b and the driving force is transmitted through the rib 4b and its contact with the surfaces 3d of the link 1b and the surface 3e of the link 1a, above the pivotal point, also as in my prior patent above mentioned.

An important feature of this invention resides in the fact that in moving from the position shown in Fig. 5 to that shown in Fig. 6, the links 1a and 1b pivot upon the cylindrical portion 4a of the pivot pin 4 instead of upon a sharp corner as in my prior construction.

Another important feature is the specific cross-sectional shape of the ribs 4b and 4c of the pivot pin 4 and the shape of the portions 3b and 3c of the openings 3 in the links. By forming the ribs wedge-shaped in cross-section and the openings substantially rectangular, as shown, and of a size just sufficient to permit the necessary flexing of the links, I am enabled to obtain a substantially greater amount of metal in the region indicated by the letter z in Fig. 3. This is of great importance, as that is the point where links of this nature break when subjected to excessive loads. The wedge-shaped rib is of adequate strength to withstand the driving stresses, it being understood that the relatively thin outer end has the advantage of leverage over the inner portion of the rib adjacent the cylindrical portion of the pivot, which inner portion, therefore, is made materially heavier and stronger, as shown.

Thus it will be understood that the present construction affords all of the advantages of a truly cylindrical pivot pin together with all of the advantages of the flat driving surfaces of my prior patented construction. This combination provides a chain construction which has decided advantages over any heretofore available, insofar as I am aware.

Having thus disclosed my invention, I claim:

1. A power transmission chain, comprising a plurality of links arranged in overlapping relation, each link having openings in its opposite ends, said openings comprising opposed arcuate mid-portions and oppositely extending straight walled outer portions connected therewith; and a unitary connecting pin passing through said openings, said pin having a rounded portion journaled in said mid-portions and radially projecting ribs entering said outer portions and adapted to engage the surfaces thereof to transmit the driving stresses from one link to the next.

2. A power transmission chain comprising a plurality of links arranged in overlapping relation, each link having openings in its opposite ends, said openings comprising opposed concave mid-portions and oppositely extending straight walled portions connected therewith; and a unitary connecting pin passing through said openings, said pin having a convex portion journaled in the concave portions of said openings, and longitudinally extending ribs entering said straight walled portions of said openings and adapted to engage the surfaces thereof to transmit the driving stresses from one link to the next.

3. A chain link provided with a pivot-pin opening having opposed concave mid-portions adapted to afford a journal for one portion of a pivot pin, and oppositely extending straight walled outer portions adapted to receive oppositely extending longitudinal ribs on said pivot pin.

4. A chain link provided with an elongated pivot-pin opening uniformly shaped at its opposite ends to permit flexing of the joint, the sides of said openings being formed by link walls presenting substantially flat driving faces, and opposed concave mid-portions affording a journal for a pivot pin.

5. In a chain, a plurality of side-by-side overlapping links provided with similar openings, each of said openings being elongated and formed intermediate its ends with opposed arcuate portions, and a unitary connecting pin passing through said openings, said pin being elongated in cross-section and having a rounded mid-portion journaled in the opposed arcuate portions of said openings.

6. In a chain, a plurality of side-by-side overlapping links provided with similar openings, said openings being elongated and formed with opposed arcuate mid-portions and oppositely extending substantially rectangular outer portions; and a connecting pin passing through said openings, said pin having a rounded portion, journaled in the arcuate mid-portions of said openings, and oppositely extending longitudinal ribs, wedge-shaped in cross section, arranged within the outer portions of said openings.

7. In a chain, a plurality of side-by-side overlapping links each provided with similar openings adjacent its opposite ends, said openings being elongated and formed with opposed arcuate mid-portions and oppositely extending outer portions; and a unitary pivot pin arranged within said openings, said pin having a rounded portion journaled in the arcuate mid-portions of said openings and oppositely extending longitudinal ribs within said outer portions, said ribs having a cross-sectional area materially less than the area of that portion of the opening in which it is located, thereby permitting said links to be flexed relative to each other and to said pivot pin.

8. In a chain, a plurality of side-by-side overlapping links each provided with similar openings adjacent its opposite ends, said openings being elongated and formed with opposed arcuate mid-portions and oppositely extending straight-walled outer portions; and a connecting pin arranged within said openings, said pin having a rounded portion journaled in the arcuate mid-portions of said openings and oppositely extending longitudinal ribs located within said outer portions, said ribs being radially tapered with their wider portions innermost, the openings in said links being so shaped as to engage the opposite sides of one of said ribs when the links are in a straight line and to engage the opposite sides of the other rib when flexed from said straight line.

FRIEDERICH MÜLLER.